United States Patent [19]

Yoda et al.

[11] Patent Number: 5,063,492

[45] Date of Patent: Nov. 5, 1991

[54] MOTION CONTROL APPARATUS WITH FUNCTION TO SELF-FORM A SERIES OF MOTIONS

[75] Inventors: Haruo Yoda, Tokyo; Takafumi Miyatake, Hachioji; Hitoshi Matsushima, Tachikawa, all of Japan

[73] Assignee: Hitachi, Ltd., Tokyo, Japan

[21] Appl. No.: 436,725

[22] Filed: Nov. 15, 1989

[30] Foreign Application Priority Data

Nov. 18, 1988 [JP] Japan .............................. 63-289989

[51] Int. Cl.⁵ .............................................. G06F 15/46
[52] U.S. Cl. ................................ 364/167.01; 364/513
[58] Field of Search .................... 364/167.01, 513, 148, 364/150, 164, 165

[56] References Cited

U.S. PATENT DOCUMENTS

| | | | |
|---|---|---|---|
| 4,810,946 | 3/1989 | Sweeney, Jr. ........................ | 318/561 |
| 4,852,018 | 7/1989 | Grossberg et al. ................. | 364/513 |
| 4,884,216 | 11/1989 | Kuperstein ........................... | 364/513 |

OTHER PUBLICATIONS

"System for Self-Forming Motion Pattern", by Nakano and Douyani, 23rd SICE Scientific Lecture Preliminary Papers 51-3, 7/84.
"Manipulator Control by Inverse-Dynamics Model Learned in Multi-Layer Neural Network", by Setoyama, Kawato and Suzuki, The Institute of Electronics, Information and Communication Engineers of Japan, ME and BIO-Sybernetics, Technical Report, MBE87-135.

Primary Examiner—Jerry Smith
Assistant Examiner—Paul Gordon
Attorney, Agent, or Firm—Antonelli, Terry, Stout & Kraus

[57] ABSTRACT

A motion control apparatus having a control circuit inputted with a current state of an object to be controlled and outputting a motion quantity, includes a first unit for changing the value of a motion quantity by adding a randomly variable quantity to the motion quantity; a second unit for quantifying, by using an evaluation function, the merit of change in the current state of an object caused by application of the changed motion quantity to the object; a third unit for calculating an optimum motion quantity on the basis of the changed motion quantity if the evaluation function value determined by the second unit is "positive", and on the basis of the changed motion quantity multiplied by $-1$ if the evaluation function value is "negative"; and a fourth unit for correcting the values of transformation parameters of the control circuit so that an output of the control circuit takes a value nearer to the optimum motion quantity calculated by the third unit than the motion quantity now being outputted from the control circuit.

16 Claims, 3 Drawing Sheets

ASTEROID INSTINCT (1) $\theta \leq 0.75\pi$

GOOD IF LARGER Q (2) $\theta > 0.75\pi$

GOOD IF SMALLER "CURVATURE" PARAMETER OF LEG

F I G. 5
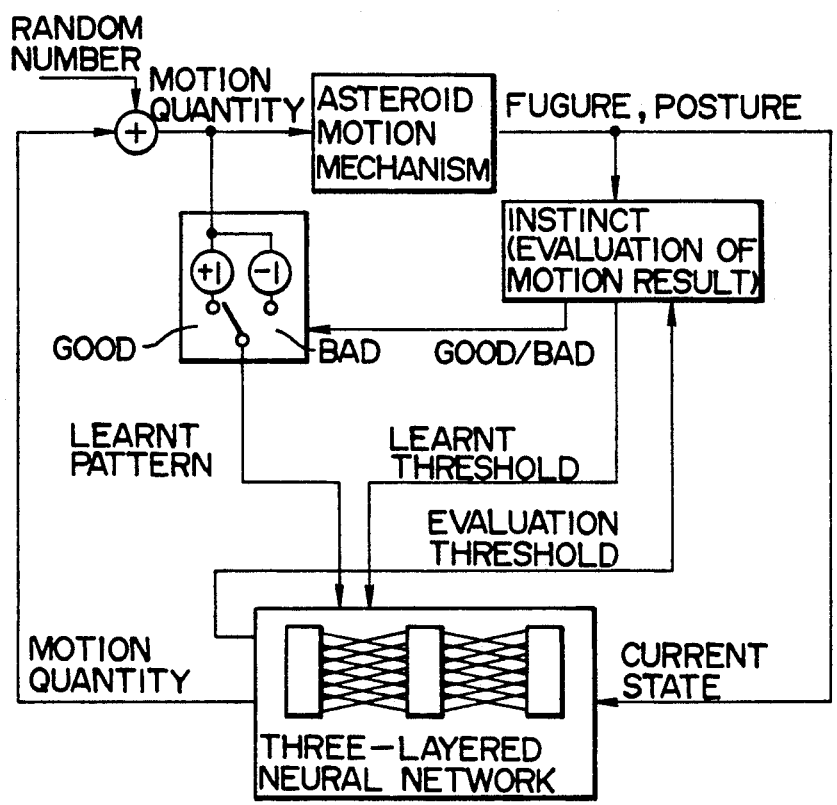

MOTION CONTROL APPARATUS WITH FUNCTION TO SELF-FORM A SERIES OF MOTIONS

BACKGROUND OF THE INVENTION

The present invention relates to a control system for controlling the motion of an object, and is particularly suitable for controlling a moving robot.

In controlling an object to move from state A to state B, a PID control method has been used generally whereby a target value changing with time during the course from state A to state B is given externally, and a difference from the target value is controlled so as to become small. In practice, however, it is difficult to find and externally give an ideal state transition if the motion is complicated. For example, consider the walk control of a moving robot. An optimum next motion cannot be determined unless taking into consideration various information such as the condition of a floor, the figure of feet and arms, the posture of the robot, the position of the robot's center of gravity, and the output values from many contact sensors. Even if one of the newest presently available computers is used, it is difficult to make a program for such walk control.

In order to solve the above problem, a study of automatically determining the motion of a robot through learning is now being made. An approach to optimize the control of a walking robot through learning is reported in a document "System for Self-forming Motion Pattern" by Nakano, and Douyani, 23th SICE Scientific Lecture Preliminary Papers S1-3, July 1984. According to this paper, while a cyclic motion is carried out by a walking robot having two articulations, a target or goal to make maximum an average progressing distance per cycle is provided to thereby optimize the parameters of cyclic motion on the trial-and-error basis. In this way, the robot which cannot move properly at first, gradually moves quickly and smoothly.

Another example having a learning function is a manipulator control as described in a document "Manipulator Control by Inverse-dynamics Model Learned in Multi-layer Neural Network" by Setoyama, Kawato and Suzuki, The Institute of Electronics, Information and Communication Engineers of Japan, ME and BIO-Sybernetics, Technical Report MBE87-135. According to this report, a multi-layer neural network is built in a control system, and a feed-forward type control circuit is formed while making minimum a shift from a target value through learning. In this way, the motion of the manipulator is optimized by gradually reducing a delay from the target value during its motion.

The above-described conventional techniques herein incorporated with reference to the above documents, positively uses a learning function so that there is a possibility of greatly simplifying the programs for a complicated control system. With the conventional technique, however, the parameters of fundamental motions only are learned. Accordingly, the fundamental motions must be first preset. It may become, therefore, difficult to control a complicated motion of a robot in some cases.

SUMMARY OF THE INVENTION

It is an object of the present invention to further develop such conventional techniques to, propose an apparatus capable of automatically forming even a complicated motion procedure through learning, and to make it possible to control a complicated motion of an object having a complicated structure.

As shown in FIG. 1, the control circuit according to this invention is constructed such that a state of an object is inputted to the circuit as a current state, and a motion quantity is outputted therefrom. In order to achieve the above object, the control system comprises:

(1) first means for changing the value of a motion quantity by adding a randomly variable quantity to the motion quantity;

(2) second means for quantifying, by using an evaluation function, the merit of change in the current state of an object caused by application of the changed motion quantity to the object;

(3) third means for calculating an optimum motion quantity on the basis of the changed motion quantity if the evaluation function value determined by second means is "positive", and on the basis of the changed motion quantity multiplied by $-1$ if the evaluation function value is "negative"; and (4) fourth means for correcting the values of transformation parameters of the control circuit so that an output of the control circuit takes a value nearer to the optimum motion quantity calculated by third means than the motion quantity now being outputted from the control circuit.

The object to be controlled shown in FIG. 1 is assumed to be a robot for the purpose of description simplicity. First, the current state of the figure and posture of a robot is inputted to the control circuit. In accordance with the inputted current state, the control circuit outputs a motion quantity for activating the robot. This motion quantity is changed randomly at the first means to thereby drive the robot in accordance with the changed motion quantity. The state of the figure and posture of the robot is therefore changed. The new state of the figure and posture is again inputted as the current state to the control circuit. The motion of the robot is therefore continuously controlled with such a loop.

For the purpose of learning, the change in figure and posture is quantified by using the evaluation function. If the evaluation function value is good, it means that the motion quantity inputted to the object is good. The inputted motion quantity is therefore regarded as an optimum motion quantity outputted from the control circuit, so that the parameters of the control circuit are corrected (learnt) so as to make the output of the control circuit take the optimum motion quantity. On the other hand, if the evaluation function value is bad, it means that the motion quantity inputted to the object is bad. In this case, the inputted motion quantity is multiplied by $-1$ to produce another optimum motion quantity in accordance with which similar learning is carried out. Such learning cycle is repetitively carried out in real time while moving the robot, so that the control circuit gradually learns and outputs an optimum motion quantity. Consequently, a series of motions derived from the evaluation function are automatically systematized within the parameters of the control circuit.

As described above, only by giving a proper evaluation function, the robot can determine a desired motion by itself and carry out the motion smoothly. Other type of motions may be learned as well by changing the evaluation function. According to the present invention, a control system for controlling a complicated series of motions can be realized easily without externally supplying programs for the series of fine motions.

BRIEF DESCRIPTION OF THE DRAWINGS

FIG. 5 shows the system arrangement having an evaluation threshold value added thereto.

DESCRIPTION OF THE PREFERRED EMBODIMENTS

Figure 1:
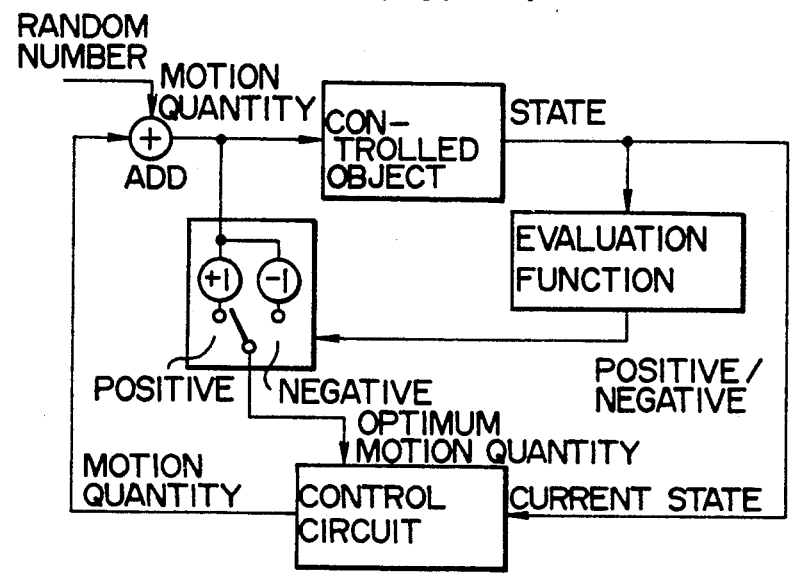
FIG. 1 illustrates the principle of this invention.
Figure 2:
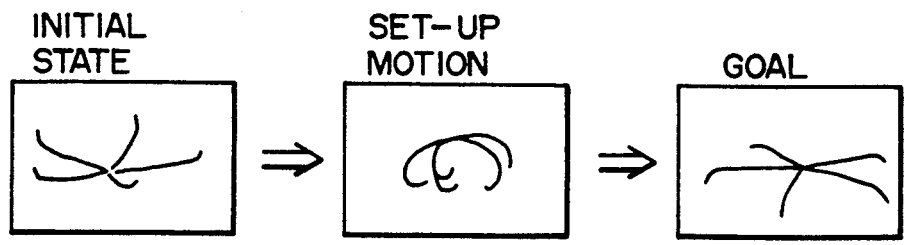
FIG. 2 shows the motions of an asteroid robot which moves from an upside-down position to a normal position, the asteroid robot being used by way of example as an object to be controlled.

The detailed contents of this invention will be given in conjunction with the embodiments. The motions of an asteroid robot which moves from an upside-down position to a normal position will be given by way of example in the following description. As shown in FIG. 2, such a set-up motion of an asteroid robot include a series of motions wherein the asteroid initially turned upside down, gets up to take a normal position or goal while kicking and struggling its legs. An asteroid which has not turned upside down in the past even only once, instinctively feels anxious and tries to get up. However, the asteroid does not know how to move so that it only randomly kicks and struggles its five legs. Even if the asteroid moves the legs restlessly at first, it happens that the abdomen is turned sideways. At such time, it instinctively considers that the motion was proper, and repeats such motions. After repetition of such motions, it also happens that the abdomen is turned further sideways. The asteroid memorizes the motions so that it can move the abdomen sideways more reliably and quickly. After repetition of such motions, the abdomen is turned from sideways to downward, and in the meantime, it sets up with the abdomen completely turned downward. If an asteroid learned such a set-up motion by itself experiences many set-up motions, it can fully learn the more efficient set-up motion.

The present invention seeks to realize a flexible control system without a need of programs, by making a machine follow the above-described learning procedure actually carried out by an asteroid.

Figure 3:
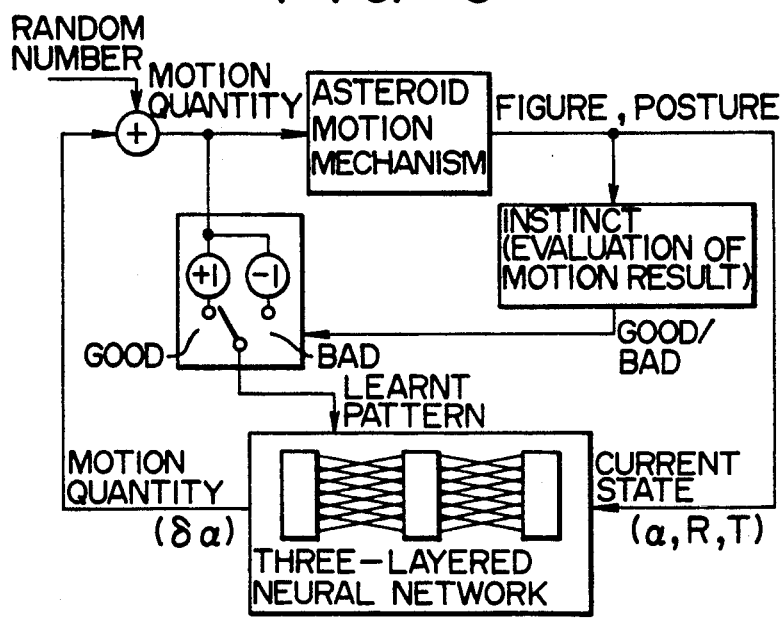
FIG. 3 is a diagram showing an embodiment of the control system for an asteroid robot.
Figure 4:
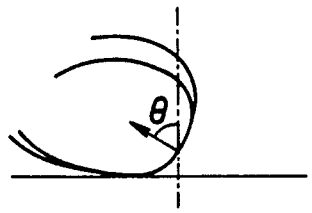
FIG. 4 illustrates the instinct of an asteroid robot.
Figure 4:
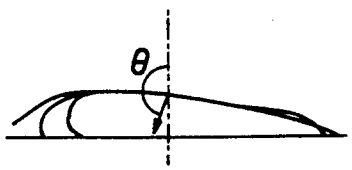

FIG. 3 shows an embodiment of the control system according to the present invention. In the upper portion of FIG. 3, there is shown a motion mechanism of an asteroid robot, i.e., an object to the controlled, and in the lower portion a control circuit constructed of a three-layered neural network. The figure and posture of the asteroid robot are first observed and inputted as the current state to the three-layered neural network which in turn outputs a motion quantity for moving the asteroid robot. This motion quantity is added with a randomly variable quantity (uniform random number) to thereby generate a new motion quantity in accordance with which the motion mechanism of the asteroid robot is actuated. Then, the figure and posture of the asteroid robot changes slightly. This changed figure and posture are again inputted to the neural network as the current state. With this feedback loop, the asteroid robot can be automatically and completely driven. For the purpose of learning, the change in figure and posture is determined in accordance with "instinct". The instinct of the asteroid robot is that it essentially wishes to direct its abdomen downward. In this embodiment, therefore, as shown in FIG. 4 there is provided a first evaluation function of a change quantity $\delta\theta$ of an angle $\theta$, which function evaluates such that if the angle of a vector indicating the abdomen direction is directed further downward, the motion is good. In order to obtain a final goal state after the set-up motion after the abdomen vector is directed downward to a certain degree, there is also provided a second evaluation function which evaluates such that if the curvature parameter of a leg become small, i.e., if the leg is stretched and relaxed, then the motion was good. Whether the motion was good or bad is determined in accordance with the evaluation functions. If good, the motion quantity per se which drove the object is used as a pattern learned by the neural network. "Learning" means to change the weight coefficients of the neural network so as to make the output of the neural network nearer to the learned pattern. For example, this learning can be practiced easily by using a well-known back propagation method. On the other hand, if the evaluation result is bad which means that the motion was bad, the motion quantity is multiplied by $-1$ to use an inversed pattern as a learned pattern to further proceed similar learning. Such learning cycle is repeated in real time so that a series of set up motions are automatically systematized within the weight coefficients of the three-layered neutral network.

Next, the input/output of the neutral network will be described in more detail. It is assumed that the three-dimensional coordinate values of a leg, at a certain point, of the asteroid robot is represented as $F(k, d; \alpha)$ in an asteroid robot coordinate system which uses as its origin the center of the abdomen, and as its z-axis direction the direction of the abdomen. F represents a three-dimensional vector representing the coordinate values, k represents the leg number among five legs ($k=1, \ldots, 5$), d represents a distance parameter from the center of the abdomen, and $\alpha$ represents a vector composed of a parameter indicating the figure. If the degree of freedom for determining the way each leg is bent, is two, the $\alpha$ is a vector having ten elements in total, and represents the figure of the asteroid robot. The posture of the asteroid robot on the other hand can be defined by the transformation parameters by which the asteroid robot coordinate system is transformed into a coordinate system of a real space within which the asteroid robot is present. The posture parameters include a parallel motion vector T and a three-dimensional rotation matrix R. Therefore, the current state representing the posture and figure of the asteroid robot at a certain time t can be represented by $\alpha$, T and R. These factors are the input signals to respective input ports of the neural network.

The motion quantity is a quantity for changing the parameter $\alpha$ representing the figure of the asteroid robot. If the vector $\alpha$ is composed of 10 elements as described above, it becomes necessary for the neural network to deliver ten independent outputs via ten output nodes.

The randomly variable quantity to be added to the motion quantity is a uniform random number. Each motion quantity outputted from the neural network is added, for example, with one tenth in average of the uniform random number.

The evaluation functions regarding the instinct can be formed readily in the following manner. The value $\delta\theta$ of the evaluation function which evaluates the downward motion of the abdomen can be calculated from the rotation matrix R of the asteroid robot. Similarly, the value of the second evaluation function which evaluates the relaxation state after set-up motion can be readily calculated from the figure parameter $\alpha$. The present invention is fully reduced to practice in the above manner. Depending upon its application, the learning speed may be lowered. In such a case, various additional devices may be conducted to speed up the learning. Such additional devices will be described.

First, consider the magnitude of the randomly variable quantity (random number) to be added to the motion quantity. If the average magnitude of random numbers for the motion quantities is too small, it is difficult for a new motion to appear so that the learning speed lowers. On the other hand, if the average magnitude is too large, it becomes difficult to converge the learning into a certain state. In view of this, it is desirable that the ratio of the randomly variable quantity to the motion quantity outputted from the neural network is made large at the start of learning, and made gradually smaller as the learning proceeds. As a practical means for this, the ratio of the randomly variable quantity to the motion quantity may be made small in accordance with the number of experiences to the goal state. In this case, if the goal is not reached after a predetermined count number of motions for reaching from the initial state to the goal state, the ratio of the randomly variable quantity to the motion quantity may be made gradually larger.

Depending upon the particular application involved use of simple evaluation functions only may lead to discontinuity of motions because the evaluation values take maximum values before reaching the goal. In such a case, according to the present invention, a new evaluation threshold value is arranged to be outputted from the neural network as shown in FIG. 5. The motion quantity is evaluated as good only when the evaluation function value exceeds the threshold value. There is further provided means for correcting (learning) the parameters of the neural network by supplying a learning pattern by which the evaluation threshold value is reduced in amount by the value of (evaluation function value−evaluation threshold value), if a difference (evaluation function value−evaluation threshold value) becomes "negative" after starting from the initial threshold value of "0". In this manner, even for the case where the evaluation function value takes a smaller value for any motion, the evaluation threshold value decreases during such stagnating motions of the robot, so that the value (evaluation function value−evaluation threshold value) ultimately becomes positive, thus avoiding such stagnating motions of the robot and allowing the robot to reach the final goal. In other words, according to the present invention practically any series of motions, no matter how complicated they may be, are automatically formed within the parameters in the control circuit.

As appreciated from the foregoing description, the present invention can be reduced in practice in various applications. The gist of the present invention is that an object to be controlled forms by itself an optimum series of motions through its own learning. It is apparent that the scope of this invention contains the case where the weight coefficients of the neural network after learning are read and copied to a neural network of another system from which the learning function only was removed. For example, while simulating a part or whole of a system with softwares, the weight coefficients produced by a computer may be copied to a real system.

Repetitive operations of learning will bring about a more perfect learning.

According to the present invention, a control system can be readily configured by providing only a simple evaluation function, which system can find by itself a series of complicated motions and execute the motions. Since it is not necessary for the control to prepare programs for a series of motions as conventional, the robot with complicated motions which the conventional technique has been difficult to control, can be controlled easily in practice.

Furthermore, since learning is continuously made, even a failure such as partial destruction of an object to be controlled or a change in operation environments occurs, such failure or change can be dealt with easily by a flexible, and highly reliable control system thus realized.

We claim:

1. A motion control apparatus having a control circuit for controlling an object, the control circuit being inputted with a current state of said object and outputting a motion quantity by which the object is driven, comprising:
   first means for changing the value of the motion quantity by adding a randomly variable quantity to the motion quantity;
   second means for quantifying, by using an evaluation function, the merit of change in the current state of an object caused by application of the changed motion quantity to the object;
   third means for calculating an optimum motion quantity on the basis of the changed motion quantity if the evaluation function value determined by second means is "positive", and on the basis of the changed motion quantity multiplied by $-1$ if the evaluation function value is "negative"; and
   fourth means for correcting the values of transformation parameters of the control circuit so that an output of the control circuit takes a value nearer to the optimum motion quantity calculated by third means than the motion quantity now being outputted from the control circuit;
   whereby said parameters are corrected while a motion control system is actually driven, to ultimately and automatically form a series of motions starting from a initial state to a target state within said control circuit.

2. A motion control apparatus according to claim 1, wherein said first means comprises fifth means for changing with time an average value of the randomly variable quantity to be added.

3. A motion control apparatus according to claim 2, wherein said fifth means comprises means for gradually making small the average value of the randomly variable quantities to be added, in accordance with the number of experiences of the series of motions starting from the initial state to the target state.

4. A motion control apparatus according to claim 2, wherein said fifth means comprises means for gradually making large the average value of the randomly variable quantities to be added, in accordance with the number of experiences of the series of motions starting from the initial state to the target state.

5. A motion control apparatus according to claim 2, wherein said control circuit is a multi-layer neural network, and correcting said transformation parameters is carried out by a back propagation calculation method.

6. A motion control apparatus according to claim 2, wherein as an output from said control circuit, an evaluation threshold value for the current state is outputted, and there is provided means for correcting said transformation parameters in said control circuit so that said evaluation threshold value is reduced in amount by a difference value between said evaluation function value from said second means and said evaluation threshold value, i.e., a difference value (said evaluation function value - said evaluation threshold value), if said difference is "negative".

7. A motion control apparatus according to claim 2, further comprising means for changing said evaluation function and said transformation parameters in said control circuit upon reception of an external instruction, to thereby provide a plurality of motion functions to the same object to be controlled.

8. A motion control apparatus according to claim 1, wherein as an output from said control circuit, an evaluation threshold value for the current state is outputted, and there is provided means for correcting said transformation parameters in said control circuit so that said evaluation threshold value is reduced in amount by a difference value between said evaluation function value from said second means and said evaluation threshold value, i.e., a difference value (said evaluation function value−said evaluation threshold value), if said difference is "negative".

9. A motion control simulator wherein at least one of said control circuit and said object in the motion control apparatus recited in claim 1 are simulators made of programs in a computer, to thereby calculate said transformation parameters of said control circuit.

10. A motion control simulator according to claim 9, wherein said transformation parameters are copied through data communication or a medium such as a ROM or floppy disk.

11. A motion control apparatus according to claim 10, further comprising means for changing said evaluation function and said transformation parameters in said control circuit upon reception of an external instruction, to thereby provide a plurality of motion functions to the same object to be controlled.

12. A motion control apparatus according to claim 1, further comprising means for changing said evaluation function and said transformation parameters in said control circuit upon reception of an external instruction, to thereby provide a plurality of motion functions to the same object to be controlled.

13. A motion control apparatus according to claim 1, wherein said transformation parameters are copied through data communication or a medium such as a ROM or floppy disk.

14. A motion control apparatus according to claim 13, further comprising means for changing said evaluation function and said transformation parameters in said control circuit upon reception of an external instruction, to thereby provide a plurality of motion functions to the same object to be controlled.

15. A motion control apparatus according to claim 1, wherein said control circuit is a multi-layer neural network, and correcting said transformation parameters is carried out by a back propagation calculation method.

16. A motion control simulator wherein both of said control circuit and said object in the motion control apparatus recited in claim 1 are simulators made of programs in a computer, to thereby calculate said transformation parameters of said control circuit.

* * * * *